(12) United States Patent
Yanagita et al.

(10) Patent No.: US 7,718,986 B2
(45) Date of Patent: May 18, 2010

(54) RADIATION IMAGE CONVERSION PANEL, PRODUCTION METHOD OF THE SAME, AND X-RAY IMAGE CAPTURING SYSTEM

(75) Inventors: Takafumi Yanagita, Tokyo (JP); Tadashi Arimoto, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 118 days.

(21) Appl. No.: 12/017,223

(22) Filed: Jan. 21, 2008

(65) Prior Publication Data
US 2008/0179542 A1 Jul. 31, 2008

(30) Foreign Application Priority Data
Jan. 25, 2007 (JP) ............................. 2007-014803

(51) Int. Cl.
*A61B 6/00* (2006.01)
(52) U.S. Cl. ...................................................... 250/581
(58) Field of Classification Search .................. 250/581
See application file for complete search history.

(56) References Cited

U.S. PATENT DOCUMENTS

| 3,859,527 | A |  | 1/1975 | Luckey |  |
|---|---|---|---|---|---|
| 4,563,580 | A |  | 1/1986 | Ishizuka |  |
| 4,628,208 | A | * | 12/1986 | Arakawa | ................ 250/484.4 |
| 2004/0227113 | A1 | * | 11/2004 | Isoda et al. | ................ 250/581 |
| 2005/0023494 | A1 | * | 2/2005 | Okada et al. | ................ 250/581 |

FOREIGN PATENT DOCUMENTS

| JP |  | 55012144 |  | 1/1980 |
| JP |  | 2-058000 |  | 2/1990 |
| JP |  | 2002250797 | A * | 9/2002 |
| JP |  | 2005091222 |  | 4/2005 |
| JP |  | 2006125854 |  | 5/2006 |

\* cited by examiner

*Primary Examiner*—David P Porta
*Assistant Examiner*—Kiho Kim
(74) *Attorney, Agent, or Firm*—Lucas & Mercanti, LLP

(57) ABSTRACT

A radiation image conversion panel containing a substrate having thereon a phosphor layer, wherein the phosphor layer is formed with a vapor deposition method, and an adhesion force of the phosphor layer with the substrate is greater than a breaking strength of the phosphor layer.

8 Claims, 1 Drawing Sheet

RADIATION IMAGE CONVERSION PANEL, PRODUCTION METHOD OF THE SAME, AND X-RAY IMAGE CAPTURING SYSTEM

This application is based on Japanese Patent Application No. 2007-014803 filed on Jan. 25, 2007 with Japan Patent Office, the entire content of which is hereby incorporated by reference.

FIELD

The present invention relates to a radiation image conversion panel using a stimulable phosphor and an X-ray image capturing system, and specifically to a radiation image conversion panel composed of a stimulable phosphor layer exhibiting excellent external impact resistance, a production method thereof, and an X-ray image capturing system.

BACKGROUND

Radiation images such as X-ray images have been widely employed in the medical field for diagnosis of diseases. As a method of obtaining the X-ray images, the so called radiographic method has been widely utilized, wherein a phosphor layer (or a fluorescent screen) is exposed to X-rays, having passed through a medical patient, that is a subject, to emit visible light, which exposes a silver halide photosensitive material (hereinafter also referred to simply as a photosensitive material) in the same manner as in usual picture-taking, and thereafter a visible silver image is produced via development processing.

Recently, however, instead of an image forming method using a photosensitive material incorporating a silver halide, a new method for directly capturing images from a phosphor layer has been proposed.

This method includes a method of imaging via fluorescence detection, wherein radioactive rays, having passed through a subject, is absorbed in a phosphor, followed by stimulating this phosphor, for example, via light or heat energy so as to emit radiation energy, accumulated in the phosphor via the above absorption, as fluorescence.

Specifically, a radiation image conversion method using a stimulable phosphor (hereinafter also referred to simply as a phosphor) is known (for example, refer to Patent Documents 1 and 2).

This method is one which employs a radiation image conversion panel containing a stimulable phosphor as follows: the stimulable phosphor layer of this radiation image conversion panel is irradiated with radioactive rays having been passed through a subject, resulting in accumulation of radiation energy corresponding to the radiation transmittance density of each portion of the subject; thereafter, the stimulable phosphor is stimulated via an electromagnetic wave (or an exciting light) such as visible or infrared light in chronological order to emit the radiation energy, having been accumulated in the stimulable phosphor, as stimulated emission light; and signals based on the intensity of the emission light are converted into electrical signals, for example, via photoelectric conversion, whereby the electrical signals are reproduced as a visible image on a recording material such as a silver halide photosensitive material or a display device such as a CRT.

The above reproduction method of a radiation image exhibits the advantage of obtaining a radiation image showing great detail information at a far lower exposure dose, compared to conventional radiographic methods employing a radiographic film in combination with an intensifying screen.

Since a radiation image conversion panel employing the stimulable phosphor accumulates radiation image information, followed by emitting the accumulated energy via scanning exciting light, another accumulation of a new radiation image may be conducted after the scanning, resulting in repetitive use of the conversion panel. Namely, while one radiographic film is consumed for each image in a conventional radiographic method, a radiation image conversion panel may be repeatedly utilized via this radiation image conversion method, resulting in advantages in resource conservation and economic efficiency.

Further, in recent years, a radiation image conversion panel exhibiting higher sharpness has been demanded. As a method of enhancing sharpness, various attempts to enhance sensitivity and sharpness have been investigated, for example, by controlling the form itself of the formed stimulable phosphor.

As one of these attempts, a method employing a radiation image conversion panel incorporating a stimulable phosphor layer, structured of elongated columnar crystals, has been proposed, wherein the elongated columnar crystals are formed on a substrate via a vapor growth method (also called a vapor deposition method) so that the crystal axis of the columnar crystals is inclined at a predetermined angle relative to the normal direction of the substrate (refer to Patent Document 3).

Recently, a radiation image conversion panel incorporating a stimulable phosphor has been proposed, wherein an alkali halide such as CsBr is utilized as a phosphor host (or matrix) and Eu is utilized as an activator, resulting in high X-ray conversion efficiency, which has not been conventionally realized.

However, in radiation image conversion panels used under a variety of conditions, adhesion between the substrate and the phosphor layer is one of the critical characteristics. To enhance the adhesion, there has been disclosed a method of placing a resinous sublayer containing a cross-linking agent between the substrate and the phosphor layer (Patent Documents 4-6). In cases in which only a resinous sublayer is placed, when forming the stimulable phosphor layer on the resinous sublayer of high surface roughness via the vapor growth method, poor adhesion to the substrate occurs and accordingly the crystal structure of the phosphor layer is unevenly formed, resulting in a tendency to cause varying sharpness and uneven graininess in imaging via a radiation image conversion panel. Further, temporal stability of the characteristics is likely to decrease because the film thickness of the resinous sublayer is too high.

(Patent Document 1) U.S. Pat. No. 3,859,527

(Patent Document 2) Japanese Patent Publication Open to Public Inspection (hereinafter referred to as JP-A) No. 55-12144

(Patent Document 3) JP-A No. 2-58000

(Patent Document 4) U.S. Pat. No. 4,563,580

(Patent Document 5) JP-A No. 2005-91222 (Patent Document 6) JP-A No. 2006-125854

SUMMARY

An object of the present invention is to provide a radiation image conversion panel exhibiting enhanced flexibility, excellent external impact resistance and excellent adhesion of a stimulable phosphor layer, a production method of the radiation image conversion panel, and an X-ray image capturing system.

An object of the present invention may be achieved employing the following embodiments.

1. One of the embodiments of the present invention is a radiation image conversion panel comprising a substrate having thereon a phosphor layer, wherein the phosphor layer is formed with a vapor deposition method, and an adhesion force of the phosphor with the substrate is greater than a breaking strength of the phosphor layer.

2. Another embodiment of the present invention is a radiation image conversion panel, wherein the substrate is a flexible substrate, and a sublayer comprising an organic resin is provided between the substrate and the phosphor layer.

3. Another embodiment of the present invention is a radiation image conversion panel, wherein a thickness ratio of the phosphor layer to the sublayer is between 10:1 and 1000:1.

4. Another embodiment of the present invention is a radiation image conversion panel, wherein the sublayer is hardened by a cross linking reaction.

5. Another embodiment of the present invention is a radiation image conversion panel, wherein the phosphor is a stimulable phosphor.

6. Another embodiment of the present invention is a radiation image conversion panel, wherein the phosphor is a compound comprising CsBr as a matrix component.

7. Another embodiment of the present invention is a method of preparing the radiation image conversion panel comprising the steps of:

(ia) heating the substrate equal to or larger than a glass transition point (Tg) or a softening point of the substrate, or (ib) heating the substrate equal to or larger than a glass transition point (Tg) or a softening point of the organic resin in the sublayer; and (ii) evaporating the phosphor on the heated support to form the phosphor layer.

8. Another embodiment of the present invention is a method of preparing the radiation image conversion panel comprising the steps of:

providing the sublayer comprising the organic resin and a cross-linking agent on the substrate;

heating the substrate provided with the sublayer equal to or larger than a glass transition point (Tg) of the organic resin in the sublayer for 10 hours or more so as to harden the organic resin; and evaporating the phosphor on the support provided with the sublayer having been hardened so as to form the phosphor layer.

9. Another embodiment of the present invention is an X-ray image capturing system comprising a transportable container to contain the radiation image conversion panel of claim 1 therein;

an irradiation section to irradiate the radiation image conversion panel contained in the transportable container with X-rays; and a reading system to read information recorded in the radiation image conversion panel.

The present invention has provided a radiation image conversion panel exhibiting excellent adhesion between a stimulable phosphor layer and the substrate and enhanced resistance to external stress such as impact, and a production method thereof, as well as an X-ray image capturing system.

DESCRIPTION OF THE PREFERRED EMBODIMENT

Figure 1:
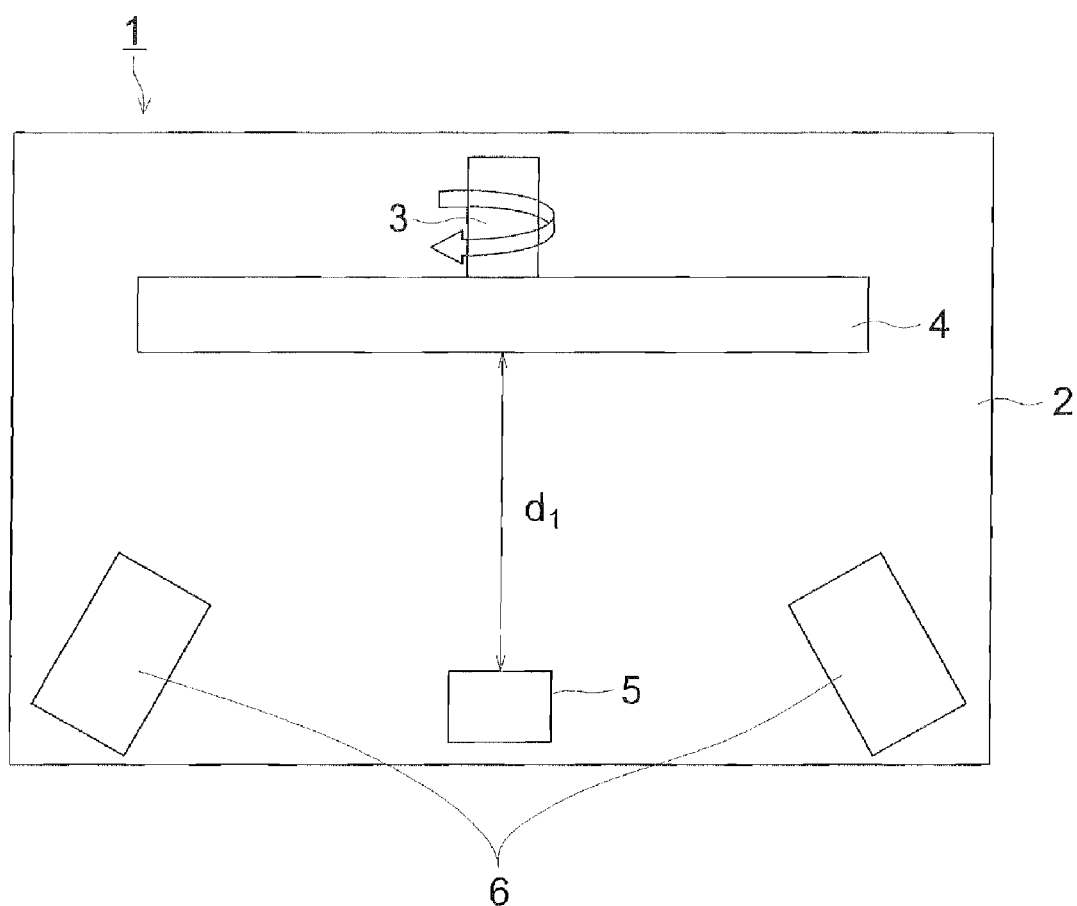
FIG. 1 is a schematic view showing one example of a deposition apparatus utilized to form the stimulable phosphor layer of the present invention.

The present invention will now be detailed. By controlling the adhesion force of the phosphor with the substrate to be greater than the breaking strength of the phosphor, the object of the present invention can be achieved (Substrate)

The substrate of the radiation image conversion panel utilized in the present invention is described below.

As the substrate employed for the radiation image conversion panel of the present invention, various kinds of glass, polymer materials, and metal are utilized, including, for example, plate glass such as quartz, borosilicate glass, or chemically-hardened glass; organic resinous films such as cellulose acetate film, polyester film, polyethylene terephthalate film, polyamide film, polyimide film, triacetate film, or polycarbonate film; and metal sheets such as aluminum, iron, or copper, or metal sheets carrying a coated layer composed of an oxide thereof Of these, organic resinous films are preferable.

(Sublayer)

According to the present invention, a sublayer is preferably placed between the substrate and the stimulable phosphor layer.

Resins employed for the sublayer are not specifically limited, including, for example, polyvinyl alcohol, polyvinyl butyral, polyvinyl formal, polycarbonate, polyester resins, polyethylene terephthalate, polyethylene, nylon, (meth) acrylic acid or (meth)acrylate, vinyl esters, vinyl ketones, styrenes, diolefins, (methacrylamides, vinyl chlorides, vinyl vinylidenes, cellulose derivatives such as nitrocellulose, acetyl cellulose, or diacetyl cellulose, silicon resins, polyurethane resins, polyamide resins, various synthetic rubber resins, phenol resins, epoxy resins, urea resins, melamine resins, and phenoxy resins. Of these, hydrophobic resins such as polyester resins or polyurethane resins are preferable from the viewpoint of adhesion between the substrate and the stimulable phosphor layer and anti-corrosion properties of the substrate.

The film thickness of the sublayer of the present invention is 0.1-10 μm, preferably 1-5 μm. When the film thickness of the sublayer is less than 0.1 μm, adhesion force between the substrate and the stimulable phosphor layer tends to decrease in some cases, and when being more than 10 μm, temporal stability of quality such as sharpness tends to be degraded.

Measurement devices via a surface roughness measurement method known in the art such as a stylus method or a laser gauge interferometory may be utilized.

The sublayer of the present invention may contain a cross-linking agent to enhance its film strength in addition to a resin. Usable cross-linking agents are not specifically limited, including, for example, multifunctional isocyanates and derivatives thereof, melamines and derivatives thereof, amino resins and derivatives thereof, but multifunctional isocyanate compounds are preferable. Examples of the multifunctional isocyanate compounds include, for example, CORONATE HX and CORONATE 3041 (produced by Nippon Polyurethane Industry Co., Ltd.).

The amount used of the cross-linking agent varies depending on the characteristics of the targeted radiation image conversion panel, the types of materials for use in the stimulable phosphor layer and the substrate, and the types of resins for use in the sublayer. In consideration of maintaining adhesion force between the stimulable phosphor layer and the substrate, a used amount of at most 50% by weight based on the amount of the sublayer is preferable, but 5-30% by weight is more preferable. In cases of less than 5% by weight, a cross-linking density tends to be too low, resulting in inadequate heat resistance and strength. In cases of more than 30% by weight, a cross-linking density tends to be too high, resulting in poor toughness with the sublayer (namely being fragile), which causes the sublayer to be cracked.

In the present invention, before coating the stimulable phosphor layer on the sublayer, having been coated on the substrate, heat treatment is carried out at 40-150° C. for 1-100 hours to complete reaction of the resin with the cross-linking agent in the sublayer.

The sublayer is produced by coating a sublayer coating solution on the substrate, followed by being dried. Coating methods are not specifically limited. Coating is conducted employing coaters known in the art such as a doctor blade coater, roll coater, knife coater, extrusion coater, as well as a spin coater.

(Stimulable Phosphor)

The stimulable phosphor of the present invention will now be described. The phosphor of the present invention is preferably a stimulable phosphor, but the stimulable phosphor represented by Formula (1) is preferable.

$$M^1X \cdot aM^2X'_2 : eA, A'' \quad \text{Formula (1)}$$

wherein $M^1$ represents at least one kind of alkali metallic atom selected from atoms including Li, Na, K, Rb, and Cs; $M^2$ represents at least one kind of divalent metallic atom selected from atoms including Be, Mg, Ca, Sr, Ba, Zn, Cd, Cu, and Ni; X and X' represent at least one kind of halogen atom selected from atoms including F, Cl, Br, and I; A and A'' represent at least one kind of rare earth atom selected from atoms including Eu, Tb, In, Ce, Tm, Dy, Pr, Ho, Nd, Yb, Er, Gd, Lu, Sm, and Y; and a and e represent a numeric value in the range expressed by equations $0 \leq a < 0.5$ and $0 < e \leq 0.2$, respectively In the stimulable phosphor represented by Formula (1), $M^1$ represents at least one kind of alkali metallic atom selected from atoms including Na, K, Rb, and Cs. Of these, at least one kind of alkali metallic atom selected from atoms including Rb and Cs is preferable, but Cs is more preferable.

$M^2$ represents at least one kind of divalent metallic atom selected from atoms including Be, Mg, Ca, Sr, Ba, Zn, Cd, Cu, and Ni. Of these, divalent metallic atoms selected from atoms including Be, Mg, Ca, Sr, and Ba are preferably utilized.

A represents at least one kind of metallic atom selected from atoms including Eu, Tb, In, Ga, Ce, Tm, Dy, Pr, Ho, Nd, Yb, Er, Gd, Lu, Sm, Y, Tl, Na, Ag, Cu, and Mg.

From the viewpoint of enhancing stimulated emission luminance, at least one kind of halogen atom selected from F, Cl, and Br is preferably utilized, although X, X', and X'' represent at least one kind of halogen atom selected from atoms including F, Cl, Br, and I. However, at least one kind of halogen atom selected from Br and I is more preferable.

The stimulable phosphor represented by Formula (1) may be produced, for example, via a production method described below.

As raw materials of the phosphor, (a) at least one kind of or at least two kinds of compounds are utilized, being selected from NaF, NaCl, NaBr, NaI, KF, KCl, KBr, KI, RbF, RbCl, RbBr, RbI, CsF, CsCl, CsBr, and CsI.

Further, (b) at least one kind of or at least two kinds of compounds are utilized, being selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $BaI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF2$, $CdCl_2$, $CdBr_2$, $CdI_2$, $CuF_2$, $CuCl_2$, $CuBr_2$, $CuI_2$, $NiF_2$, $NiCl_2$, $NiBr_2$, and $NiI_2$.

Still further, (c) compounds represented by Formula (1) are utilized, wherein the compounds contain metallic atoms selected from atoms including Eu, Tb, In, Cs, Ce, Tm, Dy, Pr, Ho, Nd, Yb, Er, Gd, Lu, Sm, Y, Tl, Na, Ag, Cu, and Mg.

In the compounds represented by Formula (1), the following relationships are satisfied: $0 \leq a < 0.5$ for a preferably $0 \leq a < 0.01$; and $0 < e \leq 0.2$ for e, preferably $0 < e \leq 0.1$.

Further, the stimulable phosphor layer of the present invention is preferably formed via a vapor growth method.

As the vapor growth method used to prepare the stimulable phosphor, a deposition method, sputtering method, CVD method, and ion plating method may be utilized.

According to the present invention, the following methods may be exemplified.

In the deposition method firstly exemplified, initially, a substrate is placed in a deposition apparatus, followed by being exhausted to a vacuum degree of about $1.333 \times 10^{-4}$ Pa. Subsequently, at least one of the above stimulable phosphors is vaporized by heating via a resistance heating method or electron beam method to allow the stimulable phosphor layer to grow on the substrate at the desired thickness. Consequently, a stimulable phosphor layer containing no binder is formed, but in the above deposition process, it is also possible to form the stimulable phosphor layer in plural stages.

Further, in the deposition process, it is possible to synthesize the targeted stimulable phosphor on the substrate and to form a stimulable phosphor layer thereon simultaneously via a co-deposition method employing a plurality of resistance heaters or electron beams.

After terminating the deposition, it is preferable to produce the radiation image conversion panel of the present invention so that a protective layer is placed on the side opposite to the substrate of the stimulable phosphor layer, as appropriate. Incidentally, a process of placing the substrate may follow formation of the stimulable phosphor layer on a protective layer.

Further, in the deposition method, a substance (namely a substrate, protective layer, or intermediate layer) to be deposited may be cooled or heated during deposition, as appropriate.

Still further, the stimulable phosphor layer may be heat-treated after deposition. Also, in the deposition method, a reactive deposition method may be employed, if applicable, wherein deposition is carried out by introducing gas such as $O_2$ or $H_2$.

In the sputtering method exemplified as a second method, similarly to the deposition method, a substrate incorporating a protective layer or intermediate layer is placed in a sputtering apparatus, followed by being temporarily exhausted to a vacuum degree of about $1.333 \times 10^{-4}$ Pa. Subsequently, an inert gas such as Ar or Ne for use in sputtering is introduced into the sputtering apparatus to allow the gas pressure to be about $1.333 \times 10^{-1}$ Pa. Thereafter, sputtering is carried out using the stimulable phosphor as the target to allow a stimulable phosphor layer to grow on the substrate at the desired thickness.

In the sputtering process, similarly to the deposition method, various kinds of applied treatment may be employed.

A third method is a CVD method, and a fourth one is an ion plating method.

Further, in the vapor growth method, it is preferable that a growth rate of the stimulable phosphor layer be 005-300 μm/min. A growth rate of less that 0.05 μm/min. unfavorably results in low productivity of the radiation image conversion panel of the present invention. Also, a growth rate of more than 300 μm/min unfavorably results in the difficulty of controlling the growth rate.

In cases obtaining a radiation image conversion panel via the deposition method or sputtering method, the radiation image conversion panel, which is preferable in terms of sensitivity and resolution, may be favorably obtained since a filling density of the stimulable phosphor is enhanced due to the absence of a binder.

The film thickness of the stimulable phosphor layer varies depending on the intended use of the radiation image conversion panel and the type of the stimulable phosphor. However, from the viewpoint of producing effects of the present invention, the thickness is preferably 50-1000 μm, more preferably 100-600 μm, still more preferably 100-500 μm.

In preparation of the stimulable phosphor layer via the vapor growth method, the temperature of the substrate is preferably set at 100° C. at least to form the stimulable phosphor layer thereon, but more preferably set at 150° C. at least, most preferably at 150-400° C.

A stimulable phosphor layer for use in the radiation image conversion panel of the present invention is preferably produced by forming the stimulable phosphor represented by Formula (1) on the substrate via vapor growth. It is preferable that the stimulable phosphor be formed into columnar crystals during layer formation.

To form a stimulable phosphor layer structured of columnar crystals, the compounds (namely the stimulable phosphors) represented by Formula (1) are utilized. Of these, CsBr phosphors represented by Formula (2) shown below are most preferably utilized.

$$CsX:A \qquad \text{Formula (2)}$$

wherein X represents Br or I, and A represents Eu, In, Tb, Tl, or Ce.

In a method of forming a phosphor layer on the substrate via a vapor deposition method, a stimulable phosphor layer composed of independent elongated columnar crystals may be produced by supplying vapor or a raw material of the stimulable phosphor via a vapor growth (namely deposition) method such as a deposition method. In these cases, the shortest distance between the substrate and a crucible used is preferably set commonly to 10-60 cm so as to correspond to the average range of the stimulable phosphor.

The stimulable phosphor serving as a vaporization source is placed in the crucible after being homogeneously dissolved or after being molded with a press or hot press. At this time, it is preferable to carry out degassing treatment. To vaporize the stimulable phosphor from the vaporization source, a scanning method using electron beams, discharged from an electron gun, is employed, but deposition may be conducted via any other appropriate methods.

Further, it is not necessary that the vaporization source is the stimulable phosphor, but a mixture with the raw material of the stimulable phosphor may be utilized.

Still further, an activator may be doped in a phosphor host afterward. For example, after deposition of only CsBr serving as a host, Tl serving as an activator may be doped for the following reasons: since crystals each are independent, doping may be adequately carried out even when the film thickness is large; and since the crystals tend not to grow, MTF may not decrease.

White pigments may reflect stimulated emission light.

Examples of the white pigments include $TiO_2$ (anatase or rutile type), MgO, $PbCO_3.Pb(OH)_2$, $BaSO_4$, $Ai_2O_3$, M(II)FX (herein, M(II) is at least one of Ba, Sr, and Ca; and X is at least one of Cl and Br), $CaCO_3$, ZnO, $Sb_2O_3$, $SiO_2$, $ZrO_2$, lithopone ($BaSO_4.ZnS$), magnesium silicate, basic silicosulfate, basic lead phosphate, aluminum silicate. Since these white pigments exhibit excellent opacifying properties and a high refractive index, light may be reflected or refracted. Therefore, stimulated emission light may be readily scattered, resulting in the markedly enhanced sensitivity of a radiation image conversion panel obtained.

Further, as substances featuring high optical absorptance, for example, carbon black, chromium oxide, nickel oxide, iron oxide, and blue colorants are utilized. Of these, carbon black may also absorb stimulated emission light.

Further, as colorants, either organic or inorganic colorants are applicable. Examples of organic colorants include Zabon First Blue 3G (produced by Hoechst AG), Estrol Bril Blue N-3RL, (produced by Sumitomo Kagalcu Co., Ltd.), D & C Blue No. 1 (produced by National Aniline Co.), Spirit Blue (produced by Hodogaya Kagaku Co., Ltd.), Oil Blue No. 603 (Produced by Orient Chemical Industries, Ltd.), Kiton Blue A (produced by Ciba Geigy Co.), Eisen Catilon Blue GLH (produced by Hodogaya Kagaku Co., Ltd.), Lake Blue AFH (produced by Kyowa Sangyo Co., Ltd.), Primocyanine 6GX (produced by Inahata Sangyo Co., Ltd.), Brilacid Green 6BH (produced by Hodogaya Kagaku Co., Ltd.), and Cyan Blue BNRCS (Produced by Toyo Ink Co., Ltd.), and Lyonoyl Blue SL (Produced by Toyo Ink Co., Ltd.). There are also exemplified organic metal complex colorants such as Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, and 74460. Examples of inorganic colorants include ultramarine blue, cobalt blue, celurean blue, chromium oxide and $TiO_2$—ZnO—Co—NiO based pigments.

To produce a stimulable phosphor layer via deposition, it is preferable that a sublayer be coated on the substrate and dried, followed by formation of the stimulable phosphor layer via various deposition methods.

Incidentally, a deposition apparatus, as shown in FIG. 1, is typically utilized to form the stimulable phosphor layer via a vapor growth method.

In FIG. 1, symbol 1 designates a deposition apparatus; symbol 2 designates a vacuum chamber; symbol 3 designates a support rotation mechanism (a support rotation function); symbol 4 designates a support; symbol 5 designates a vaporization source; and symbol 6 designates a support surface temperature-controlling heater. Symbol $d_1$ represents the distance between the support 4 and the vaporization source.

(Protective Layer)

Further, the stimulable phosphor layer of the present invention may incorporate a protective layer A protective layer may be formed by directly coating a protective layer-coating solution on the stimulable phosphor layer, or a protective layer, having been separately formed, may be allowed to adhere to the stimulable phosphor layer. Alternatively, the stimulable phosphor layer may be formed on a separately formed protective layer. As materials used for the protective layer, commonly-used protective layer materials are employed, including cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoromonochloroethylene, tetrafluoroethylene-hexafluoropropylene copolymer, vinylidene chloride-vinyl chloride copolymer, and vinylidene chloride-acrylonitrile copolymer. There may also be employed a transparent glass substrate as the protective layer. Further, the protective layer may be formed by laminating an inorganic material such as SiC, $SiO_2$, SiN, or $Al_2O_3$ via such a method as deposition or sputtering. It is preferable that the layer thickness of the protective layer be commonly from 0.1-2000 µm approximately.

In the present invention, the beam diameter of a laser used to irradiate the stimulable phosphor layer is preferably at most 100 µm, more preferably at most 80 µm.

Examples of the laser include He—Ne laser, He—Cd laser, Ar ion laser, Kr ion laser, $N_2$ laser, YAC laser, other second harmonics, ruby laser, semiconductor lasers, various dye lasers, and metal vapor lasers such as copper vapor laser. A continuous oscillation laser such as He—Ne laser or Ar ion laser is commonly desirable, but a pulse oscillation laser is also usable if the scanning time per pixel of the panel is synchronized with a pulse time. Further, in a separation method employing delayed emission, as disclosed in JP-A No. 59-22046, modulation employing a pulse oscillation laser is preferable to one employing a continuous oscillation laser.

Of the various types of laser light sources, a semiconductor laser, which is compact and inexpensive, as well as requiring no modulator, is specifically preferable.

EXAMPLES

The present invention will now be detailed with reference to examples, but the present invention is by no means limited thereto.

Example 1

Preparation of Radiation Image Conversion Panels 1-21

A 200 mm square aluminum plate substrate of a 0.5 mm thickness was placed on a spin coater, and then a coating medium was dripped on the substrate, followed by rotating the coater at 1000 rpm for one minute to form a resinous sublayer. The coating medium was prepared by dissolving a commercially available polyester resin (Biron 200, Tg: 60° C., produced by Toyobo Co., Ltd.) in a mixed solvent of methyl ethyl ketone/toluene (1/1 mixture ratio by weight), and polyisocyanate (for example, CORONATE L, produced by Nippon Polyurethane Industry Co., Ltd.) was dripped in the intermediate coating medium at 15% by weight based on the polyester resin. The mixed coating medium was stirred using a dispersing device to give the final coating medium. The amount dripped of the mixed solvent of methyl ethyl ketone/toluene was adjusted so as to allow the film thickness of the sublayer, prepared with the spin coater, to be equal to the desired one. The substrate carrying the coated coating medium was dried in a thermal chamber at 100° C. for 10 min, followed by being cured in the thermal chamber at 80° C. for 10 hours to give a substrate for use in deposition.

A stimulable phosphor layer of a 200 µm thickness composed of the stimulable phosphor (CsBr:Eu) was formed on the substrate using the deposition apparatus shown in FIG. 1.

A vacuum chamber was temporarily exhausted to at most $1.0 \times 10^{-4}$ Pa, followed by introducing Ar gas to allow a vacuum degree to be $1.0 \times 10^{-2}$ Pa. While maintaining the surface temperature of the support at 100° C., deposition was conducted until the film thickness of the stimulable phosphor layer reached 200 µm to prepare a radiation image conversion panel sample.

Herein, in the deposition apparatus shown in FIG. 1, the vaporization source was arranged at the right angles to the normal line passing at the center of the support, wherein the distance $d_1$ between the support and the vaporization source was 60 cm. Deposition was conducted as the support was rotated.

Subsequently, the stimulable phosphor layer was covered with a thin layer (film thickness: 2.0 µm) of a tetrafluoroethylene-hexafluoropropylene copolymer, serving as a protective layer, followed by sealing the peripheral part of the substrate and the protective layer with an adhesive under a dry air ambience to give Radiation Image Conversion Panel Sample 1 featuring a sealed phosphor layer structure.

Radiation Image Conversion Panel Samples 2-5 were prepared in the same manner as for Radiation Image Conversion Panel Sample 1 except that the type of the substrate was changed.

Samples 6-9 were prepared in the same manner as for Radiation Image Conversion Panel Sample 1 except that both the type of the substrate and the film thickness of the phosphor layer formed via deposition were changed.

Radiation Image Conversion Panel Samples 10-13 were prepared in the same formulation as for Radiation image Conversion Panel Sample 6 except for the film thickness of the sublayer was changed by adjusting the solid concentration of the sublayer resin.

Radiation Image Conversion Panel Samples 14 and 15 were prepared in the same formulation as for Radiation Image Conversion Panel Sample 6 except that the film thickness of the sublayer was changed by adjusting the solid concentration of the sublayer resin and the film thickness of the phosphor layer was also changed.

Radiation Image Conversion Panel Sample 16 was prepared in the same manner as for Radiation Image Conversion Panel Sample 1 except that no curing was conducted after drying the sublayer.

Radiation Image Conversion Panel Samples 17 and 18 were prepared In the same manner as for Radiation Image Conversion Panel Sample 16 except that the solid content of the coating medium was adjusted to give a phosphor layer of the desired film thickness, wherein no adhesive was added.

Radiation Image Conversion Panel Sample 19 was prepared in the same manner as for Radiation Image Conversion Panel Sample 6 except that an ultraviolet durable resin (Hitaloid, Tg: 35° C., produced by Hitachi Chemical Co., Ltd.) was utilized instead of the polyester resin.

Radiation Image Conversion Panel Sample 20 was prepared in the same manner as for Radiation Image Conversion Panel Sample 6 except that oxygen plasma was conducted at an intensity of 1000 W/min employing a plasma apparatus (produced by Mory Engineering Co., Ltd.), wherein no sublayer was formed.

Radiation Image Conversion Panel Sample 21 was prepared in the same manner as for Radiation Image Conversion Panel Sample 1 except that the substrate was not treated.

(Evaluation Method)

The Radiation Image Conversion Panels obtained were evaluated as described below. The results are listed in Table 1.

(Measurement Methods of Adhesion Force and Breaking Strength)

Evaluation was conducted via the TOPPLE method. According to the TOPPLE method, the surface of a substrate, whose phosphor layer has been removed, is observed. When an at least 50% area of the substrate is exposed, the obtained numerical value is designated as adhesion force, and in this case, breaking strength is equal to or more than the numerical value.

When an at least 50% area of the phosphor layer remains in the portion to which peeling has been applied, the obtained numerical value is designated as breaking strength, and then adhesion force is equal to or more than the numerical value.

TOPPLE method: the bottom face of a circular column, to which an adhesive has been applied, is allowed to adhere to the surface of the phosphor, followed by being thoroughly cured. A load cell is attached to the top of the circular column, which is then pulled down at a constant rate. Provided that a weight, applied at the time when the phosphor layer peels off the substrate and the circular column topples down, is designated as F, adhesion force or breaking strength f at this time may be determined by the following equation:

$$f = 4H \times F / \pi R^3$$

A data cell which contains "> a value" in Table 1 refers to "larger than this value." For example, adhesion force of Sample 1 is larger than 5.0 MPa.

(Characteristic Evaluation Via Drop Test)

The obtained radiation image conversion panel, allowed to adhere to a cassette tray of REDIUS 190 (produced by Konica Minolta Medical & Graphic, Inc.) with a double-side tape, was dropped at a height of 75 cm above a concrete floor 100 times The phosphor was observed at the initial stage (namely prior to the drop test) and after the drop test.

1: Unusable due to many broken and peeled portions observed.

2: Unusable due to some broken and peeled portions observed.

3: A small number of broken and peeled portions are observed.

4: A few broken and peeled portions are observed.

5: Neither a broken portion nor a peeled one is observed.

(Luminance Degradation Rate)

A sample of the panel, allowed to adhere to a cassette tray of REDIUS 190 (produced by Konica Minolta Medical & Graphic, Inc.) with a double-side tape, was irradiated with X-rays of a tube voltage of 80 kVp with 60 mA, followed by being stimulated by scanning with a semiconductor laser (680 nm) of 100 mW. Thereafter, stimulated emission light emitted from the phosphor layer was detected by a photomultiplier (photomultiplier R1305, produced by Hamamatsu Photonics K.K.), converted into electrical signals, and stored on a hard disk via analog-digital conversion.

The signal values were analyzed, and then luminance after the drop test was determined relative to the initial luminance. A luminance degradation rate was calculated from the initial luminance and the luminance after the drop test. A smaller value is referred to as "less degraded", being "superior."

TABLE 1

| Sample No. | Substrate Type | Substrate Thickness (μm) | Phosphor Layer Thickness (μm) | Type | Hardener | Sublayer Presence or Absence of Cross-linkage | Sublayer Thickness (μm) | Phosphor/Sublayer Thickness Ratio |
|---|---|---|---|---|---|---|---|---|
| 1 | Aluminum | 500 | 200 | Polyester | Isocyanate | present | 1 | 200 |
| 2 | Polyimide | 500 | 200 | Polyester | Isocyanate | present | 1 | 200 |
| 3 | PET | 500 | 200 | Polyester | Isocyanate | present | 1 | 200 |
| 4 | PEN | 500 | 200 | Polyester | Isocyanate | present | 1 | 200 |
| 5 | PES | 500 | 200 | Polyester | Isocyanate | present | 1 | 200 |
| 6 | Polyimide | 500 | 80 | Polyester | Isocyanate | present | 1 | 80 |
| 7 | Polyimide | 500 | 500 | Polyester | Isocyanate | present | 1 | 500 |
| 8 | Polyimide | 500 | 800 | Polyester | Isocyanate | present | 1 | 800 |
| 9 | Polyimide | 500 | 1200 | Polyester | Isocyanate | present | 1 | 1200 |
| 10 | Polyimide | 500 | 200 | Polyester | Isocyanate | present | 0.1 | 2000 |
| 11 | Polyimide | 500 | 200 | Polyester | Isocyanate | present | 2 | 100 |
| 12 | Polyimide | 500 | 200 | Polyester | Isocyanate | present | 10 | 20 |
| 13 | Polyimide | 500 | 200 | Polyester | Isocyanate | present | 25 | 8 |
| 14 | Polyimide | 500 | 800 | Polyester | Isocyanate | present | 10 | 80 |
| 15 | Polyimide | 500 | 800 | Polyester | Isocyanate | present | 100 | 8 |
| 16 | Polyimide | 500 | 200 | Polyester | Isocyanate | absent | 1 | 200 |
| 17 | Polyimide | 500 | 200 | Polyester | None | absent | 1 | 200 |
| 18 | Polyimide | 500 | 200 | UV Curable Resin | UV Curing | present | 1 | 200 |
| 19 | Polyimide | 500 | 200 | Plasma | — | — | — | — |
| 20 | Polyimide | 500 | 200 | — | — | — | — | — |

| Sample No. | Breaking Strength (Mpa) | Adhesion Force (Mpa) | Breaking Location during Deposition | Unevenness Evaluation via Cassette Drop At Initial Stage | Unevenness Evaluation via Cassette Drop After Drop Test | Luminance Degradation Rate (%) | Remarks |
|---|---|---|---|---|---|---|---|
| 1 | 5.0 | >5.0 | observed | 5 | 3 | 9 | Present Invention |
| 2 | 5.0 | >5.0 | observed | 5 | 5 | 0 | Present Invention |
| 3 | 5.0 | >5.0 | observed | 5 | 4 | 5 | Present Invention |
| 4 | 5.0 | >5.0 | observed | 5 | 4 | 3 | Present Invention |
| 5 | 5.0 | >5.0 | observed | 5 | 4 | 3 | Present Invention |
| 6 | 5.5 | >5.5 | observed | 5 | 4 | 2 | Present Invention |

TABLE 1-continued

| | | | | | | | | |
|---|---|---|---|---|---|---|---|---|
| 7 | 4.5 | >4.5 | observed | 5 | 5 | 0 | Present Invention |
| 8 | 4.0 | >4.0 | observed | 4 | 4 | 7 | Present Invention |
| 9 | >0.8 | 0.8 | unobserved | 3 | 2 | 16 | Comparative Example |
| 10 | >1.8 | 1.8 | unobserved | 3 | 1 | 29 | Comparative Example |
| 11 | 5.0 | >5.0 | observed | 5 | 5 | 2 | Present Invention |
| 12 | 5.0 | >5.0 | observed | 5 | 4 | 4 | Present Invention |
| 13 | 5.0 | <5.0 | observed | 4 | 3 | 5 | Present Invention |
| 14 | 5.0 | >5.0 | observed | 4 | 3 | 6 | Present Invention |
| 15 | >4.0 | 4.0 | unobserved | 3 | 1 | 15 | Comparative Example |
| 16 | >2.0 | 2.0 | unobserved | 4 | 2 | 21 | Comparative Example |
| 17 | >1.5 | 1.5 | unobserved | 4 | 2 | 27 | Comparative Example |
| 18 | 5.0 | >5.0 | observed | 5 | 4 | 5 | Present Invention |
| 19 | >2.5 | 2.5 | unobserved | 3 | 2 | 35 | Comparative Example |
| 20 | >0.5 | 0.5 | unobserved | 3 | 1 | 43 | Comparative Example |

What is claimed is:

1. A radiation image conversion panel comprising a substrate having thereon a sublayer and a phosphor layer, the sublayer provided between the substrate and the phosphor layer,
wherein the phosphor layer is formed with a vapor deposition method, an adhesion force of the phosphor with the substrate is greater than a breaking strength of the phosphor layer, the substrate consists of polyimide, and the sublayer comprises an organic resin.

2. The radiation image conversion panel of claim 1, wherein a thickness ratio of the phosphor layer to the sublayer is between 10:1 and 1000:1.

3. The radiation image conversion panel of claim 1, wherein the sublayer is hardened by a cross-linking reaction.

4. The radiation image conversion panel of claim 1, wherein the phosphor is a stimulable phosphor.

5. The radiation image conversion panel of claim 1, wherein the phosphor is a compound comprising CsBr as a matrix component.

6. A method of preparing the radiation image conversion panel of claim 1 comprising the steps of:
(ia) heating the polyimide substrate to a temperature equal to or larger than a glass transition point (Tg) or a softening point of the polyimide substrate, or
(ib) heating the polyimide substrate to a temperature equal to or larger than a glass transition point (Tg) or a softening point of the organic resin in the sublayer; and
(ii) evaporating the phosphor on the heated support to form the phosphor layer.

7. The method of preparing the radiation image conversion panel of claim 6 comprising the steps of:
providing the sublayer comprising the organic resin and a cross-linking agent on the substrate;
heating the polyimide substrate provided with the sublayer to a temperature equal to or larger than a glass transition point (Tg) of the organic resin in the sublayer for 10 hours or more so as to harden the organic resin; and
evaporating the phosphor on the support provided with the sublayer having been hardened so as to form the phosphor layer.

8. An X-ray image capturing system comprising:
a transportable container to contain the radiation image conversion panel of claim 1 therein;
an irradiation section to irradiate the radiation image conversion panel contained in the transportable container with X-rays; and
a reading system to read information recorded in the radiation image conversion panel.

* * * * *